Patented Oct. 17, 1933

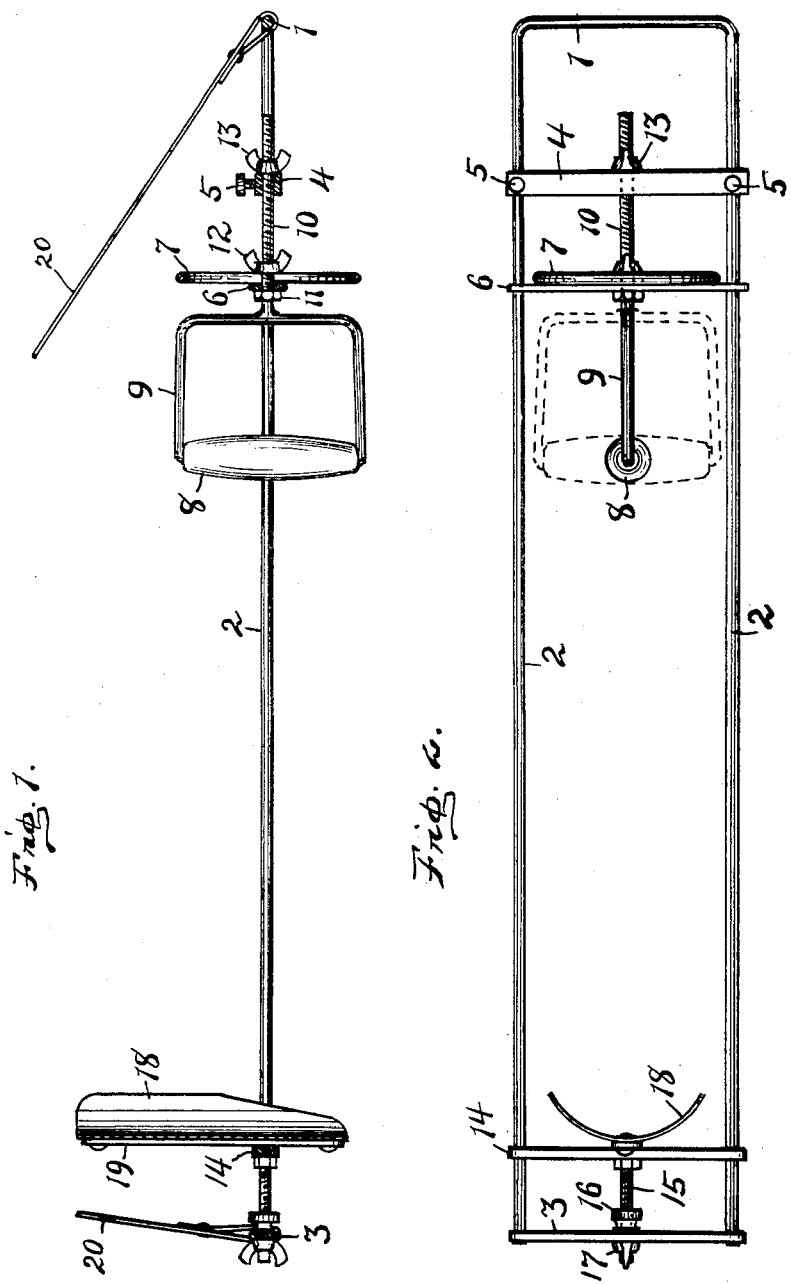

1,930,813

UNITED STATES PATENT OFFICE 1,930,813

FOREARM EXTENSION SPLINT

Harry Herschel Leiter, Warsaw, Ind.

Application May 9, 1929. Serial No. 361,679

2 Claims. (Cl. 128—85)

This invention relates to improvements in forearm extension splints, and the object of the improvement is to provide an appliance for the support of a fractured forearm, whereby through adjustments of the device, pronation and supination as well as extension of the fractured member is provided for to an extent variable in degree as the surgeon may elect. Another object is to provide an appliance for the support of a fractured forearm, which will afford a means of applying bandages to the forearm while in the state of either pronation or supination in such manner as to insure extension thereof without encumbering the humerus.

These objects are accomplished by the construction illustrated in the accompanying drawing, in which:—

Fig. 1 is a side elevation in section of a structure embodying the invention, parts being in section; and Fig. 2 is a plan view projected from Fig. 1.

The appliance consists of a frame in the form of an elongated loop 1 constructed of a metallic rod bent so as to provide parallel side members 2 spaced apart, the ends of which rod are connected by a cross-bar 3 fixed thereon.

Upon the side members 2 is mounted adjacent the forward end of the frame an adjustable cross-bar 4 provided with set screws 5 for securing the ends thereof to the corresponding side members in adjusted positions, said cross-bar being longitudinally movable respecting said frame in its adjustments.

A supporting bar 6 is mounted upon said side members, which members extend loosely through the corresponding ends thereof so as to permit longitudinal sliding movement of said bar in said frame. The sliding bar is spaced rearwardly on the frame from the adjustable cross-bar and has fixed thereon a bandage anchor 7 in the form of a ring that lies in a vertical plane in transverse relation with said frame.

A handle 8 is secured in a fork 9 that is fixed upon a threaded rod 10 which extends loosely through the supporting bar 6, and the adjustable cross-bar 4. The rod 10 has thereon a stationary nut 11 located between the fork 9 and the bar 6, and has also thereon a thumb-nut 12 adjacent the side of the bar 6 opposite the nut 11, by the turning of which thumb-nut upon the rod 10, the bar 6 becomes clamped between the nut 11 and thumb-nut 12 whereby turning movement of the rod 10 upon its axis is prevented. By manipulating the thumb-nut 12 the handle 8 may be turned transversely in the frame and secured in adjusted positions. The rod 10 has also thereon a second thumb-nut 13 that bears against the front face of the cross-bar 4, by which rearward movement of said rod and handle in the frame relative to the cross-bar 4 is limited. Also, by turning the thumb-nut 13 upon the rod 10, the handle is moved adjustably forward.

A second supporting bar 14 is slidably mounted upon the side members 2, which members extend loosely through the corresponding ends of said bar which is located at a point on the frame spaced forwardly from the fixed cross bar 3. A threaded rod 15 is fixedly secured to the supporting bar 14 at the center thereof and extends rearwardly therefrom and projects loosely through the cross-bar 3, there being thumb-nuts 16 and 17 on said rod for securing the rod to the cross-bar adjustably, whereby the supporting bar 14 is correspondingly adjusted longitudinally on the frame. A saddle consisting of a curved plate 18 is vertically disposed between the side members 2 and is secured to a reinforcing bar 19 that is fixed on the sliding bar 14 which is rigidly fixed on the threaded rod 15.

In applying the invention, the frame is suspended in horizontal position at the side of the patient by means of a strap 20 that extends over the shoulder opposite to that of the fractured member, the ends of the strap being connected with the corresponding ends of the frame. The humerus is positioned in the saddle, the fractured forearm is placed between the side members, and the handle is moved lengthwise in the frame and is adjustably turned upon the axis of the rod 10 to a position suited to the grasp of the hand. The forearm is supported in the frame by means of bandages (not shown) wound around the frame so as to encompass both side members and extend beneath the forearm to form a sling therefor. Adhesive bandages are then applied to the wrist and connected to the anchor ring, and the posterior forearm is similarly anchored to the saddle. The handle is adjustably turned and secured so as to sustain the hand in such position as is necessary to effect proper alinement of the fractured member or members. Traction is then applied to the fractured member by adjustment of the rods 10 and 15 respectively in the cross-bars 4 and 3. The humerus may be lightly bandaged to the saddle to further secure the appliance in place without occasioning objectionable pressure upon the anterior thereof.

What I claim is:—

1. A splint consisting of a frame having parallel side members spaced apart; a cross-bar connecting said members in the forward part of the frame and being longitudinally adjustable relative thereto; a sliding bar on said members back of said cross-bar; an anchor ring fixed on said sliding bar; a handle having a support including a threaded rod that extends loosely through said sliding bar and cross-bar, said rod being provided with means for securing it immovably in said sliding bar and for adjustably moving said rod longitudinally forward in said cross-bar whereby said handle may be adjustably turned upon the axis of said rod and move longitudinally relative to the frame; a vertically disposed saddle adjustably supported adjacent the rear end of the frame; and a strap for suspending said frame from the body of the patient.

2. A splint consisting of a frame having parallel side members spaced apart; a cross-bar connecting said members in the forward part of the frame and being longitudinally adjustable relative thereto; a sliding bar on said members back of said cross-bar; an anchor ring fixed on said sliding bar; a handle having a support including a threaded rod that extends loosely through said sliding bar and cross-bar, said rod being provided with means for securing it immovably in said sliding bar and for adjustably moving said rod longitudinally forward in said cross-bar whereby said handle may be adjustably turned upon the axis of said rod and move longitudinally relative to the frame; and a vertically disposed saddle adjustably supported adjacent the rear end of the frame.

H. HERSCHEL LEITER.